(12) United States Patent
Chen et al.

(10) Patent No.: US 10,266,776 B2
(45) Date of Patent: Apr. 23, 2019

(54) IRON-BASED CATALYST, METHOD FOR PREPARING THE SAME, AND METHOD FOR PRODUCING ALPHA-OLEFINS USING THE SAME

(71) Applicant: WUHAN KAIDI ENGINEERING TECHNOLOGY RESEARCH INSTITUTE CO., LTD., Wuhan (CN)

(72) Inventors: Yilong Chen, Wuhan (CN); Yanfeng Zhang, Wuhan (CN); Jiangang Chen, Wuhan (CN); Dechen Song, Wuhan (CN); Juan Zhang, Wuhan (CN); Taomei Sun, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 79 days.

(21) Appl. No.: 15/299,441

(22) Filed: Oct. 20, 2016

(65) Prior Publication Data
US 2017/0037321 A1 Feb. 9, 2017

Related U.S. Application Data

(63) Continuation-in-part of application No. PCT/CN2015/072400, filed on Feb. 6, 2015.

(30) Foreign Application Priority Data

Apr. 21, 2014 (CN) .......................... 2014 1 0160961

(51) Int. Cl.
*C10G 2/00* (2006.01)
*B01J 23/889* (2006.01)
(Continued)

(52) U.S. Cl.
CPC .............. *C10G 2/332* (2013.01); *B01J 21/08* (2013.01); *B01J 23/745* (2013.01); *B01J 23/75* (2013.01);
(Continued)

(58) Field of Classification Search
CPC . B01J 23/745; B01J 23/78; B01J 23/80; B01J 23/83; B01J 23/862; B01J 23/8892; B01J 23/8903; B01J 21/08
See application file for complete search history.

(56) References Cited

U.S. PATENT DOCUMENTS

2009/0075814 A1* 3/2009 Duvenhage .............. B01J 21/08
502/245
2011/0294908 A1* 12/2011 Wu .......................... B01J 23/78
518/713

(Continued)

OTHER PUBLICATIONS

Machine translatin of CN102441400, publiucation date May 9, 2012.*

*Primary Examiner* — Jun Li
(74) *Attorney, Agent, or Firm* — Matthias Scholl P.C.; Matthias Scholl

(57) ABSTRACT

A catalyst including between 50.0 and 99.8 percent by weight of iron, between 0 and 5.0 percent by weight of a first additive, between 0 and 10 percent by weight of a second additive, and a carrier. The first additive is ruthenium, platinum, copper, cobalt, zinc, or a metal oxide thereof. The second additive is lanthanum oxide, cerium oxide, magnesium oxide, aluminum oxide, silicon dioxide, potassium oxide, manganese oxide, or zirconium oxide.

9 Claims, 1 Drawing Sheet

(51) Int. Cl.

| | |
|---|---|
| *B01J 23/745* | (2006.01) |
| *B01J 23/75* | (2006.01) |
| *B01J 23/78* | (2006.01) |
| *B01J 23/72* | (2006.01) |
| *B01J 23/80* | (2006.01) |
| *B01J 21/08* | (2006.01) |
| *B01J 23/83* | (2006.01) |
| *B01J 23/86* | (2006.01) |
| *B01J 23/89* | (2006.01) |
| *B01J 35/00* | (2006.01) |
| *B01J 35/08* | (2006.01) |
| *B01J 37/00* | (2006.01) |
| *B01J 37/02* | (2006.01) |
| *B01J 37/04* | (2006.01) |
| *B01J 37/08* | (2006.01) |

(52) U.S. Cl.
CPC ............... *B01J 23/78* (2013.01); *B01J 23/80* (2013.01); *B01J 23/83* (2013.01); *B01J 23/86* (2013.01); *B01J 23/862* (2013.01); *B01J 23/889* (2013.01); *B01J 23/8892* (2013.01); *B01J 23/89* (2013.01); *B01J 23/8906* (2013.01); *B01J 35/0006* (2013.01); *B01J 35/0013* (2013.01); *B01J 35/08* (2013.01); *B01J 37/009* (2013.01); *B01J 37/0244* (2013.01); *B01J 37/04* (2013.01); *B01J 37/088* (2013.01); *C10G 2/00* (2013.01); *C10G 2/333* (2013.01)

(56) References Cited

U.S. PATENT DOCUMENTS

| | | | |
|---|---|---|---|
| 2013/0109561 A1* | 5/2013 | Kharas | B01J 23/06 502/177 |
| 2013/0237410 A1* | 9/2013 | Chun | B01J 23/75 502/245 |
| 2013/0274093 A1* | 10/2013 | Woodfield | B01J 27/22 502/177 |
| 2014/0045953 A1* | 2/2014 | Daly | B01J 23/8913 518/714 |
| 2016/0001267 A1* | 1/2016 | Duvenhage | B01J 37/03 518/713 |

* cited by examiner

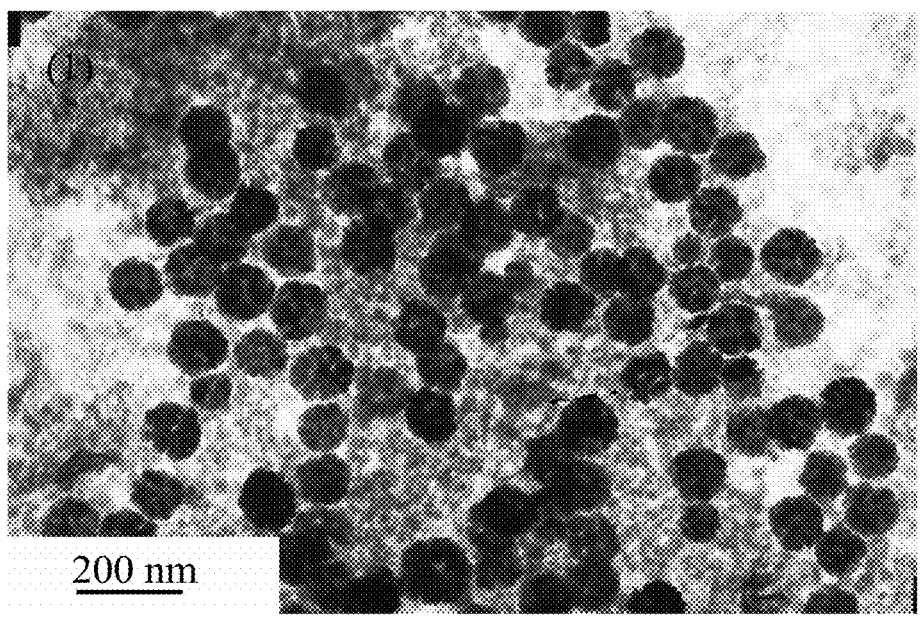

IRON-BASED CATALYST, METHOD FOR PREPARING THE SAME, AND METHOD FOR PRODUCING ALPHA-OLEFINS USING THE SAME

CROSS-REFERENCE TO RELATED APPLICATIONS

This application is a continuation-in-part of International Patent Application No. PCT/CN2015/072400 with an international filing date of Feb. 6, 2015, designating the United States, now pending, and further claims foreign priority benefits to Chinese Patent Application No. 201410160961.9 filed Apr. 21, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to an iron-based catalyst, a method for preparing the catalyst, and a method for producing alpha-olefins using the catalyst.

Description of the Related Art

Conventional catalysts for preparing alpha-olefins have irregular particle shapes, uneven pore sizes, and non-uniform active center. This results in low yield of the alpha-olefins.

SUMMARY OF THE INVENTION

In view of the above-described problems, it is one objective of the invention to provide an iron-based catalyst, a method for preparing the catalyst, and a method for producing alpha-olefins using the catalyst.

To achieve the above objective, in accordance with one embodiment of the invention, there is provided a catalyst for alpha-olefin preparation, comprising between 50.0 and 99.8 percent by weight of iron, between 0 and 5.0 percent by weight of a first additive, between 0 and 10 percent by weight of a second additive, and a carrier. The first additive is ruthenium, platinum, copper, cobalt, zinc, or a metal oxide thereof. The second additive is lanthanum oxide, cerium oxide, magnesium oxide, aluminum oxide, silicon dioxide, potassium oxide, manganese oxide, or zirconium oxide. The carrier is silicon dioxide. The iron, the first additive, and the carrier are prepared into mono-dispersed particles using a thermal diffusion method, and the second additive is adapted to soak the mono-dispersed particles.

In a class of this embodiment, optionally, a content of the first additive is between 0 and 2 wt. %. A content of the second additive being metal oxide is between 2 wt. % and 6 wt. %. A content of the iron is between 60 wt. % and 97 wt. %.

In a class of this embodiment, optionally, a content of the carrier being the silicon dioxide is between 1 wt. % and 40 wt. %. A content of the first additive is between 1 wt. % and 2 wt. %. A content of the second additive being metal oxide is between 2 wt. % and 6 wt. %. A content of the iron is between 52 wt. % and 96 wt. %.

In accordance with another embodiment of the invention, there is provided a method for preparing the catalyst, the method comprising:

1) mixing anhydrous ferric nitrate, a nitrate of the first additive, and amorphous silicon dioxide with n-octanol to form a mixed solution, wherein a total weight percentage of the anhydrous ferric nitrate, the nitrate of the first additive, and the amorphous silicon dioxide in the mixed solution is between 3 wt. % and 20 wt. %; stirring the mixed solution so that the nitrate is dissolved and heating the mixed solution to a temperature of between 140 and 180° C.; keeping the temperature constant for 4 hrs; cooling and filtering the mixed solution to yield a first product; drying the first product to yield a black solid; grinding the black solid for 20 to 40 mins, then roasting the black solid for 5 hrs at between 400 and 600° C. to yield a catalyst precursor; and 2) dissolving the second additive in water or ethyl alcohol to form a second solution; performing dry impregnation by adding the second solution to the catalyst precursor to yield an impregnated catalyst precursor, and conducting an aging treatment of the impregnated catalyst precursor for between 12 and 24 hrs to form a second product; drying the second product at a temperature of between 100 and 130° C., and roasting the second product for 4 to 10 hrs at a temperature of between 300 and 1200° C.; and tabletting the second product and sieving to yield the catalyst.

In a class of this embodiment, a catalyst comprises between 1 and 40 percent by weight of the carrier, between 1 and 2 percent by weight of the first additive, between 2 and 6 percent by weight of the second additive, and between 52 and 96 percent by weight of the iron.

In a class of this embodiment, the anhydrous ferric nitrate, the nitrate of the first additive, and the amorphous silicon dioxide are mixed with n-octanol to form the mixed solution in 1) of the method, where a total weight percentage of the anhydrous ferric nitrate, the nitrate of the first additive, and the amorphous silicon dioxide in the mixed solution is between 5 wt. % and 15 wt. %

In a class of this embodiment, a particle size of the catalyst precursor is between 50 and 60 nm. The catalyst precursor is spherical and monodispersed.

The invention also provides a method for producing alpha-olefin from syngas, the method comprising adding the catalyst to a fixed bed of a Fischer-Tropsch synthesis reaction, the Fischer-Tropsch synthesis reaction being performed under the following conditions: reducing condition: 300-500° C., 0.2-1.2 Megapascal, 400-1500 $h^{-1}$ (V/V), 6-18 hrs, and under pure hydrogen atmosphere; and a syngas reaction condition: 190-360° C., 0.5-5.0 Megapascal, 400-20000 $h^{-1}$ (V/V), and $H_2/CO=1/1-3/1$.

The invention further provides a method for producing alpha-olefin from syngas, the method comprising adding the catalyst to a slurry bed of a Fischer-Tropsch synthesis reaction, the Fischer-Tropsch synthesis reaction being performed under the following conditions: reducing condition: 300-500° C., 0.2-1.2 Megapascal, 400-1400 rpm, 400-1500 $h^{-1}$ (V/V), 6-18 hrs, and under pure hydrogen atmosphere; and a syngas reaction condition: 190-360° C., 0.5-5.0 Megapascal, 400-20000 $h^{-1}$ (V/V), 400-1400 rpm, and $H_2/CO=1/1-3/1$.

Advantages of the catalyst, the method for preparing the catalyst, and the method for producing alpha-olefin from syngas using the catalyst according to embodiments of the invention are summarized as follows:

1. Compared with the conventional method, the thermal decomposition method in the invention is used to prepare the catalyst with regular shape, uniform pore size, and particular microstructure. As shown in FIG. 1, the particles of the iron-based catalyst are uniform, spherical, and monodispersed. The particle size is about 70 nm. The structure of the catalyst ensures the active centers to be uniform and facilitates the formation of active centers. Meanwhile, as the catalyst powders have uniform shapes, the pore structures are more ideal. All of the above lead to high alpha-olefin selectivity of the catalyst.

2. Because the strengths of the iron and the additive are properly arranged, the catalyst features high reductivity and high degree of carbonization. By choosing from the types of carriers, adjusting the dosage, and using the additive, the strengths of the iron and the carrier are properly arranged, thus preventing sintering of the iron component, and avoiding components which are difficult to be reduced. The catalyst features favorable chemical properties. Due to the synergistic effect of the structure and chemical properties of the catalyst, the catalyst features high long chain alpha-olefin selectivity and activity.

3. Optionally, the catalyst is compressed to be tablets, or the catalyst is shaped via spray drying. The catalyst features favorable mechanical properties.

The method for producing alpha-olefin using the catalyst is provided. The method uses syngas in the presence of the catalyst to directly synthesize alpha-olefin. The materials, the target product, the technical route, and the method for preparing the catalyst in the invention are different from those in the prior art, thus the new technology for preparing alpha-olefins is totally different from the existing technology. Because of the monodispersed structure and the appropriate meta-carrier chemical effect, the catalyst features the appropriate active centers for producing alpha-olefin, and the catalyst features good selectivity for alpha-olefin.

BRIEF DESCRIPTION OF THE DRAWINGS

The invention is described hereinbelow with reference to accompanying drawings, in which the sole FIGURE is a transmission electron microscopy (TEM) photo of an iron-based catalyst prepared using a thermal decomposition method of an exemplary embodiment of the invention.

DETAILED DESCRIPTION OF THE EMBODIMENTS

For further illustrating the invention, experiments detailing a catalyst, a method for preparing the catalyst, and a method for producing alpha-olefin using the catalyst are described below. It should be noted that the following examples are intended to describe and not to limit the invention.

Example 1

60 g of anhydrous ferric nitrate and 10 g of amorphous silicon dioxide were mixed with 800 mL of n-octanol to form a mixed solution. The mixed solution was stirred so that the nitrate was dissolved, and the mixed solution was heated to 140° C. The temperature was maintained for 4 hrs. The mixed solution was cooled and filtrated to yield a first product. The first product was dried to yield a black solid. The black solid was grinded using a planetary mill, then the black solid was roasted in a muffle furnace for 5 hrs at 400° C. to yield a catalyst precursor. 0.55 g of $La(NO_3)_3$ was dissolved in water to form 18 mL of a second additive solution. The catalyst precursor was soaked in the second additive solution and was aged for 12 hrs to form a second product. The second product was dried at 100° C., and was roasted for 10 hrs at 800° C. The second product was compressed to be tablets and sieved to yield the catalyst 53% Fe1% $La_2O_3/SiO_2$ comprising 53 percent by weight of iron, 1 percent by weight of $La_2O_3$, and the rest was silicon dioxide.

1.5 mL of the catalyst having the particle sizes of between 60 and 80 meshes was added in a pressurized fixed bed reactor (Φ10×500 mm), in which the catalyst was heated at a programmed temperature and was reduced under pure hydrogen atmosphere. The reducing condition was: 400° C., 0.2 Megapascal, 400 $h^{-1}$ (V/V), and 18 hrs. Following the reduction, the reactor was cooled, and the syngas was introduced to perform a syngas reaction. The syngas reaction condition was: 230° C., 2.5 Megapascal, 2000 $h^{-1}$ (V/V), and $H_2/CO=2/1$. The result of the reaction is shown in Table 2.

15 mL of the catalyst having the particle size being above 140 meshes was added in a slurry agitator with a volume of 1 L, then 500 mL of liquid paraffin was added in the slurry agitator to form a third mixture. The third mixture was heated at a programmed temperature and was reduced under pure hydrogen atmosphere. The reducing condition was: 300° C., 0.2 Megapascal, 400 $h^{-1}$ (V/V), 400 rpm, and 18 hrs. Following the reduction, the reactor was cooled, and the syngas was introduced to perform a syngas reaction. The syngas reaction condition was: 240° C., 0.5 Megapascal, 3000 $h^{-1}$ (V/V), 400 rpm, and $H_2/CO=2/1$. The result of the reaction is shown in Table 2.

Example 2

80 g of anhydrous ferric nitrate and 5 g of amorphous silicon dioxide were mixed with 800 mL of n-octanol to form a mixed solution. The mixed solution was stirred so that the nitrate was dissolved, and the mixed solution was heated to 140° C. The temperature was maintained for 4 hrs. The mixed solution was cooled and filtrated to yield a first product. The first product was dried to yield a black solid. The black solid was grinded using a planetary mill, then the black solid was roasted in a muffle furnace for 5 hrs at 400° C. to yield a catalyst precursor. 0.55 g of $K_2CO_3$ was dissolved in water to form 18 mL of a second additive solution. The catalyst precursor was soaked in the second additive solution and was aged for 12 hrs to form a second product. The second product was dried at 100° C., and was roasted for 10 hrs at 400° C. The second product was compressed to be tablets and sieved to yield the iron-based catalyst 75% Fe2% $K_2$O1% $MnO/SiO_2$ comprising 75 percent by weight of iron, 2 percent by weight of $K_2O$, 1 percent by weight of MnO, and the rest was silicon dioxide.

1.5 mL of the catalyst having the particle sizes of between 60 and 80 meshes was added in a pressurized fixed bed reactor (Φ10×500 mm), in which the catalyst was heated at a programmed temperature and was reduced under pure hydrogen atmosphere. The reducing condition was: 400° C., 0.4 Megapascal, 800 $h^{-1}$ (V/V), and 12 hrs. Following the reduction, the reactor was cooled, and the syngas was introduced to perform a syngas reaction. The syngas reaction condition was: 200° C., 1.0 Megapascal, 1500 $h^{-1}$ (V/V), and $H_2/CO=3/1$. The result of the reaction is shown in Table 2.

15 mL of the catalyst having the particle size being above 140 meshes was added in a slurry agitator with a volume of 1 L, then 500 mL of liquid paraffin was added in the slurry agitator to form a third mixture. The third mixture was heated at a programmed temperature and was reduced under pure hydrogen atmosphere. The reducing condition was: 400° C., 0.4 Megapascal, 600 $h^{-1}$ (V/V), 600 rpm, and 12 hrs. Following the reduction, the reactor was cooled, and the syngas was introduced to perform a syngas reaction. The syngas reaction condition was: 200° C., 1.0 Megapascal, 2000 h$^{-1}$ (V/V), 600 rpm, and H$_2$/CO=3/1. The result of the reaction is shown in Table 2.

Example 3

60 g of anhydrous ferric nitrate, 10 g of cobalt nitrate, and 5 g of amorphous silicon dioxide were mixed with 800 mL of n-octanol to form a mixed solution. The mixed solution was stirred so that the nitrate was dissolved, and the mixed solution was heated to 140° C. The temperature was maintained for 4 hrs. The mixed solution was cooled and filtrated to yield a first product. The first product was dried to yield a black solid. The black solid was grinded using a planetary mill, then the black solid was roasted in a muffle furnace for 5 hrs at 400° C. to yield a catalyst precursor. 1.5 g of Cu(NO$_3$)$_2$ was dissolved in water to form 18 mL of a second additive solution. The catalyst precursor was soaked in the second additive solution and was aged for 12 hrs to form a second product. The second product was dried at 100° C., and was roasted for 10 hrs at 400° C. The second product was compressed to be tablets and sieved to yield the iron-based catalyst 60% Fe10% Co2% CuO/SiO$_2$ comprising 60 percent by weight of iron, 10 percent by weight of Co, 2 percent by weight of CuO, and the rest was silicon dioxide.

15 mL of the catalyst having the particle size being above 140 meshes was added in a slurry agitator with a volume of 1 L, then 500 mL of liquid paraffin was added in the slurry agitator to form a third mixture. The third mixture was heated at a programmed temperature and was reduced under pure hydrogen atmosphere. The reducing condition was: 400° C., 0.8 Megapascal, 600 h$^{-1}$ (V/V), 1000 rpm, and 10 hrs. Following the reduction, the reactor was cooled, and the syngas was introduced to perform a syngas reaction. The syngas reaction condition was: 220° C., 2.0 Megapascal, 2000 h$^{-1}$ (V/V), 1000 rpm, and H$_2$/CO=1/1. The result of the reaction is shown in Table 2.

Example 4

60 g of anhydrous ferric nitrate, 4 g of cobalt nitrate, and 5 g of amorphous silicon dioxide were mixed with 800 mL of n-octanol to form a mixed solution. The mixed solution was stirred so that the nitrate was dissolved, and the mixed solution was heated to 140° C. The temperature was maintained for 4 hrs. The mixed solution was cooled and filtrated to yield a first product. The first product was dried to yield a black solid. The black solid was grinded using a planetary mill, then the black solid was roasted in a muffle furnace for 5 hrs at 400° C. to yield a catalyst precursor. 3 g of Zr(NO$_3$)$_4$ was dissolved in water to form 18 mL of a second additive solution. The catalyst precursor was soaked in the second additive solution and was aged for 12 hrs to form a second product. The second product was dried at 100° C., and was roasted for 10 hrs at 600° C. The second product was compressed to be tablets and sieved to yield the iron-based catalyst 54% Fe5% Co4% ZrO$_2$/SiO$_2$ comprising 54 percent by weight of iron, 5 percent by weight of Co, 4 percent by weight of ZrO$_2$, and the rest was silicon dioxide.

1.5 mL of the catalyst having the particle sizes of between 60 and 80 meshes was added in a pressurized fixed bed reactor (Φ10×500 mm), in which the catalyst was heated at a programmed temperature and was reduced under pure hydrogen atmosphere. The reducing condition was: 400° C., 1.2 Megapascal, 1000 h$^{-1}$ (V/V), and 10 hrs. Following the reduction, the reactor was cooled, and the syngas was introduced to perform a syngas reaction. The syngas reaction condition was: 240° C., 3.0 Megapascal, 800 h$^{-1}$ (V/V), and H$_2$/CO=2/1. The result of the reaction is shown in Table 2.

15 mL of the catalyst having the particle size being above 140 meshes was added in a slurry agitator with a volume of 1 L, then 500 mL of liquid paraffin was added in the slurry agitator to form a third mixture. The third mixture was heated at a programmed temperature and was reduced under pure hydrogen atmosphere. The reducing condition was: 400° C., 0.4 Megapascal, 600 h$^{-1}$ (V/V), 600 rpm, and 12 hrs. Following the reduction, the reactor was cooled, and the syngas was introduced to perform a syngas reaction. The syngas reaction condition was: 200° C., 1.0 Megapascal, 2000 h$^{-1}$ (V/V), 600 rpm, and H$_2$/CO=3/1. The result of the reaction is shown in Table 2.

Example 5

80 g of anhydrous ferric nitrate, and 1 g of amorphous silicon dioxide were mixed with 800 mL of n-octanol to form a mixed solution. The mixed solution was stirred so that the nitrate was dissolved, and the mixed solution was heated to 140° C. The temperature was maintained for 4 hrs. The mixed solution was cooled and filtrated to yield a first product. The first product was dried to yield a black solid. The black solid was grinded using a planetary mill, then the black solid was roasted in a muffle furnace for 5 hrs at 400° C. to yield a catalyst precursor. 5 g of Al(NO$_3$)$_3$ was dissolved in water to form 18 mL of a second additive solution. The catalyst precursor was soaked in the second additive solution and was aged for 12 hrs to form a second product. The second product was dried at 100° C., and was roasted for 10 hrs at 800° C. The second product was compressed to be tablets and sieved to yield the iron-based catalyst 90% Fe4% Al$_2$O$_3$/SiO$_2$ comprising 90 percent by weight of iron, 4 percent by weight of Al$_2$O$_3$, and the rest was silicon dioxide.

1.5 mL of the catalyst having the particle sizes of between 60 and 80 meshes was added in a pressurized fixed bed reactor (Φ10×500 mm), in which the catalyst was heated at a programmed temperature and was reduced under pure hydrogen atmosphere. The reducing condition was: 500° C., 1.2 Megapascal, 1500 h$^{-1}$ (V/V), and 6 hrs. Following the reduction, the reactor was cooled, and the syngas was introduced to perform a syngas reaction. The syngas reaction condition was: 260° C., 5.0 Megapascal, 400 h$^{-1}$ (V/V), and H$_2$/CO=2/1. The result of the reaction is shown in Table 2.

15 mL of the catalyst having the particle size being above 140 meshes was added in a slurry agitator with a volume of 1 L, then 500 mL of liquid paraffin was added in the slurry agitator to form a third mixture. The third mixture was heated at a programmed temperature and was reduced under pure hydrogen atmosphere. The reducing condition was: 500° C., 1.2 Megapascal, 1500 h$^{-1}$ (V/V), 1400 rpm, and 6 hrs. Following the reduction, the reactor was cooled, and the syngas was introduced to perform a syngas reaction. The syngas reaction condition was: 260° C., 4.0 Megapascal, 700 h$^{-1}$ (V/V), 1400 rpm, and H$_2$/CO=2/1. The result of the reaction is shown in Table 2.

Examples 6-10

The examples follow a basic method in the Example 5, except that the content and the additive are different. The contents of the components in the examples are shown in Table 1. The content of the silicon dioxide equals to the total content of components minus the contents of the three components in Table 1.

TABLE 1

Contents of components in the examples

| Number | Content of iron | Content of the first additive | Content of the second additive |
|---|---|---|---|
| Example 1 | 53% Fe | 1% $La_2O_3$ | |
| Example 2 | 75% Fe | 2% $K_2O$ | 1% MnO |
| Example 3 | 60% Fe | 10% Co | 2% CuO |
| Example 4 | 54% Fe | 5% Co | 4% $ZrO_2$ |
| Example 5 | 90% Fe | 6% $Al_2O_3$ | |
| Example 6 | 80% Fe | 3% $Cr_2O_3$ | 0.5% $K_2O$ |
| Example 7 | 95% Fe | 1% ZnO | 0.2% $K_2O$ |
| Example 8 | 70% Fe | 2% $CeO_2$ | 0.3% CuO |
| Example 9 | 68% Fe | 2% $TiO_2$ | 0.1% Ru |
| Example 10 | 98% Fe | 1% $Al_2O_3$ | 0.2% $K_2O$ |

TABLE 2

Performance of iron-based catalyst in olefin synthesis reaction

| Catalyst | Reaction Condition | CO conversion rate % | $C_1$ selectivity % | $C_5^+$ selectivity % | Olefin content % |
|---|---|---|---|---|---|
| Example 1 | 230° C., 2000 $h^{-1}$, fixed bed | 42.5 | 6.2 | 75.1 | 61.2 |
| | 240° C., 3000 $h^{-1}$, slurry bed | 33.6 | 5.5 | 76.6 | 63.8 |
| Example 2 | 250° C., 1500 $h^{-1}$, fixed bed | 51.2 | 4.8 | 78.0 | 64.4 |
| | 260° C., 2000 $h^{-1}$, slurry bed | 40.8 | 5.2 | 77.6 | 65.1 |
| Example 3 | 240° C., 10000 $h^{-1}$, fixed bed | 12.1 | 14.8 | 58.4 | 45.7 |
| | 220° C., 2000 $h^{-1}$, slurry bed | 35.9 | 12.4 | 61.3 | 40.6 |
| Example 4 | 240° C., 800 $h^{-1}$, fixed bed | 66.7 | 9.1 | 74.0 | 58.3 |
| | 260° C., 7000 $h^{-1}$, slurry bed | 19.6 | 9.4 | 76.4 | 72.1 |
| Example 5 | 260° C., 400 $h^{-1}$, fixed bed | 33.4 | 15.7 | 47.8 | 46.1 |
| | 260° C., 700 $h^{-1}$, slurry bed | 38.4 | 15.8 | 46.5 | 35.9 |
| Example 6 | 260° C., 12000 $h^{-1}$, fixed bed | 26.3 | 4.7 | 81.1 | 64.2 |
| | 230° C., 1000 $h^{-1}$, slurry bed | 52.5 | 4.5 | 81.4 | 63.9 |
| Example 7 | 240° C., 6000 $h^{-1}$, fixed bed | 28.5 | 6.7 | 78.8 | 65.4 |
| | 250° C., 3000 $h^{-1}$, slurry bed | 43.3 | 6.1 | 79.5 | 65.9 |
| Example 8 | 280° C., 4000 $h^{-1}$, fixed bed | 71.2 | 5.2 | 81.3 | 61.4 |
| | 220° C., 1000 $h^{-1}$, slurry bed | 10.5 | 4.1 | 83.8 | 62.7 |
| Example 9 | 240° C., 2000 $h^{-1}$, fixed bed | 52.6 | 11.2 | 74.4 | 63.6 |
| Example 10 | 300° C., 4000 $h^{-1}$, slurry bed | 30.1 | 6.5 | 52.0 | 70.0 |

As shown in FIG. 1, when the contents and the preparation method in the invention are satisfied, monodispersed particles having uniform particle size of 70 nm are prepared. According to the examples, when the contents of the components are not coincident with the method in the invention, for example, the Example 3 and Example 5 have low olefin content; when the contents of the components are coincident with the method in the invention, the example has high olefin content. Within the preferable range of contents, the catalyst features higher alpha-olefin selectivity.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a catalyst, the method comprising:
   1) mixing anhydrous ferric nitrate, a nitrate of a first additive, and amorphous silicon dioxide with n-octanol to form a first solution, wherein a total weight percentage of the anhydrous ferric nitrate, the nitrate of the first additive, and the amorphous silicon dioxide in the first solution is between 3 wt. % and 20 wt. %; stirring and heating the first solution to a temperature of between 140 and 180° C. for 4 hrs to yield a heated first solution; cooling and filtering the heated first solution to yield a first product; drying the first product to yield a black solid; grinding the black solid for 20 to 40 mins to yield a ground black solid, then roasting the ground black solid for 5 hrs at between 400 and 600° C. to yield a catalyst precursor; and
   2) dissolving a precursor of a second additive in water or ethyl alcohol to form a second solution; performing dry impregnation by adding the second solution to the catalyst precursor to yield an impregnated catalyst precursor; conducting an aging treatment of the impregnated catalyst precursor for between 12 and 24 hrs to form a second product; drying the second product at a temperature of between 100 and 130° C. to yield a dried second product, and roasting the dried second product for 4 to 10 hrs at a temperature of between 300 and 1200° C. to yield a roasted second product; and tableting and sieving the roasted second product to yield the catalyst;
   wherein:
   the catalyst comprises, by a total weight of the catalyst, between 50.0 and 99.8 percent by weight of iron, between 0 and 5.0 percent by weight of the first additive, between 0 and 10 percent by weight of the second additive, and a carrier;
   the first additive is ruthenium, platinum, copper, cobalt, or zinc, or the first additive is a metal oxide selected from oxides of ruthenium, platinum, copper, cobalt, and zinc;
   the second additive is lanthanum oxide, cerium oxide, magnesium oxide, aluminum oxide, potassium oxide, manganese oxide, or zirconium oxide; and
   the carrier is silicon dioxide.

2. The method of claim 1, wherein the catalyst comprises between 1 and 40 percent by weight of the carrier, between 1 and 2 percent by weight of the first additive, between 2 and 6 percent by weight of the second additive, and the rest is the iron.

3. The method of claim 1, wherein total weight percentage of the anhydrous ferric nitrate, the nitrate of the first additive, and the amorphous silicon dioxide in the first solution is between 5 wt. % and 15 wt. %.

4. The method of claim 2, wherein total weight percentage of the anhydrous ferric nitrate, the nitrate of the first additive, and the amorphous silicon dioxide in the first solution is between 5 wt. % and 15 wt. %.

5. The method of claim 1, wherein a particle size of the catalyst precursor is between 50 and 60 nm; and the catalyst precursor is spherical and monodispersed.

6. The method of claim 2, wherein a particle size of the catalyst precursor is between 50 and 60 nm; and the catalyst precursor is spherical and monodispersed.

7. The method of claim 3, wherein a particle size of the catalyst precursor is between 50 and 60 nm; and the catalyst precursor is spherical and monodispersed.

8. The method of claim 7, wherein a particle size of the catalyst precursor is between 50 and 60 nm; and the catalyst precursor is spherical and monodispersed.

9. The method of claim 1, wherein in 2), the precursor of the second additive is $K_2CO_3$, $Zr(NO_3)_4$, or $Al(NO_3)_3$.

* * * * *